US010184580B2

(12) United States Patent
Schaefer et al.

(10) Patent No.: US 10,184,580 B2
(45) Date of Patent: Jan. 22, 2019

(54) PRESSURE RELIEF SYSTEM FOR CONTROLLED ATMOSPHERE ROOM (71) Applicant: Storage Control Systems, Inc., Sparta, MI (US)

(72) Inventors: James C. Schaefer, Rockford, MI (US); Darius L. Warne, Sparta, MI (US)

(73) Assignee: Storage Control Systems, Inc., Sparta, MI (US)

( * ) Notice: Subject to any disclaimer, the term of this patent is extended or adjusted under 35 U.S.C. 154(b) by 586 days.

(21) Appl. No.: 14/674,006

(22) Filed: Mar. 31, 2015

(65) Prior Publication Data

US 2016/0286844 A1 Oct. 6, 2016

(51) Int. Cl.
*F16K 17/00* (2006.01)
*A23B 7/148* (2006.01)

(52) U.S. Cl.
CPC ............ *F16K 17/006* (2013.01); *A23B 7/148* (2013.01)

(58) Field of Classification Search
CPC ......... F16K 17/006; A23L 3/001; A23B 7/148
USPC ........ 137/493, 493.9, 512, 516.11, 217, 218, 137/61, 102; 251/338; 454/259, 255, 454/340, 184, 256
See application file for complete search history.

(56) References Cited

U.S. PATENT DOCUMENTS

| | | | | |
|---|---|---|---|---|
| 543,480 A * | 7/1895 | Hendrickson | ........... | E03C 1/182 138/37 |
| 1,370,130 A * | 3/1921 | Larner | ................... | G05D 16/10 251/28 |
| 2,356,391 A * | 8/1944 | Fluor, Jr. | ................... | B63J 2/06 114/211 |
| 3,401,624 A * | 9/1968 | Mohrman | ............... | F24F 7/025 454/344 |
| 5,862,841 A * | 1/1999 | Wuester, Sr. | ......... | F16C 17/026 141/250 |
| 8,621,683 B2 * | 1/2014 | Coronado | ................. | E03C 1/20 4/679 |
| 2014/0065938 A1 * | 3/2014 | Waigl | .................... | B64C 1/1407 454/74 |

* cited by examiner

*Primary Examiner* — Helena Kosanovic
*Assistant Examiner* — Ko-Wei Lin
(74) *Attorney, Agent, or Firm* — Warner Norcross + Judd LLP (57) ABSTRACT A pressure/vacuum relief system having one or more pressure relief/vacuum valve assemblies disposed within the controlled atmosphere room and a vent pipe to provide two-way fluid communication between the relief valve assembly and the outside environment. The relief valve assembly may be a split valve arrangement that includes a pressure valve that opens in response to positive pressure in the controlled atmosphere room and a vacuum valve that opens response to negative pressure in the controlled atmosphere room. The pressure and vacuum valves may be incorporated into a single valve body on opposite sides of a shared chamber that is coupled to the vent pipe. In one embodiment, the vent pipe is fitted through an external wall of the controlled atmosphere room.

10 Claims, 8 Drawing Sheets

Fig. 9

PRESSURE RELIEF SYSTEM FOR CONTROLLED ATMOSPHERE ROOM

BACKGROUND OF THE INVENTION

The present invention relates to controlled atmosphere rooms and more particularly to pressure/vacuum relief systems for controlled atmosphere rooms.

Controlled atmosphere rooms are commonly used for the storage of fruits, vegetables and other perishable commodities. Through proper control of atmosphere, including gas mixture, humidity and temperature, the ripening of commodities within the controlled atmosphere room can to a large extent be controlled. A typical controlled atmosphere room includes an enclosure capable of receiving a store of fruits, vegetables or other perishable commodities, as well as gas and temperature control systems that are capable of monitoring and maintaining the desired gas mixture and internal room temperature. Various factors, such as temperature changes, commodity respiration, commodity transpiration and the introduction and exhaust of gases, can have a significant impact on pressure within the controlled atmosphere room. If not properly controlled, these changes in pressure can cause damage, for example, to the walls or ceiling of the controlled atmosphere room.

In a typical application, one or more controlled atmosphere rooms are situated within a larger building. For example, a conventional application having six controlled atmosphere rooms 100 is shown in FIGS. 1-4. Each controlled atmosphere room 100 includes a storage enclosure that is isolated from the exterior 102 and includes an atmosphere control system that maintains the desired temperature, humidity and gas mixture (See FIGS. 1 and 3). Typically, the control system is automated, relying on sensors that provide measured atmospheric conditions to a controller. The controller analyzes the measured conditions and takes the appropriate action to maintain the interior of the controlled atmosphere within the desire parameters. Proper atmospheric pressure is typically maintained using a passive arrangement of valves that allow the room to vent gas when overpressure and to draw gas in from the environment when under pressure. In this context, the term "passive" in used to indicate that the valves are directly actuated by air pressure and are not computer controlled or otherwise automated. The primary functional component in a conventional pressure/vacuum relief system is a pressure relief valve 104 that includes separate vacuum and pressure valves. In use, when a sufficient negative pressure differential builds between the controlled atmosphere room 100 and the vacuum valve inlet 106, the vacuum valve opens, thereby allowing air from outside the controlled atmosphere room 100 to be drawn in through the pressure relief valve through the vacuum valve inlet 106. As the pressure equalizes, the vacuum valve automatically closes to again isolate the controlled atmosphere room 100. Similarly, when a sufficient positive pressure differential builds between the controlled atmosphere room 100 and the pressure valve outlet 108, the pressure valve opens, thereby allowing air from inside the controlled atmosphere room 100 to vent through the pressure relief valve 104. As the pressure equalizes, the pressure valve closes to return the controlled atmosphere room to isolation.

Figure 1:
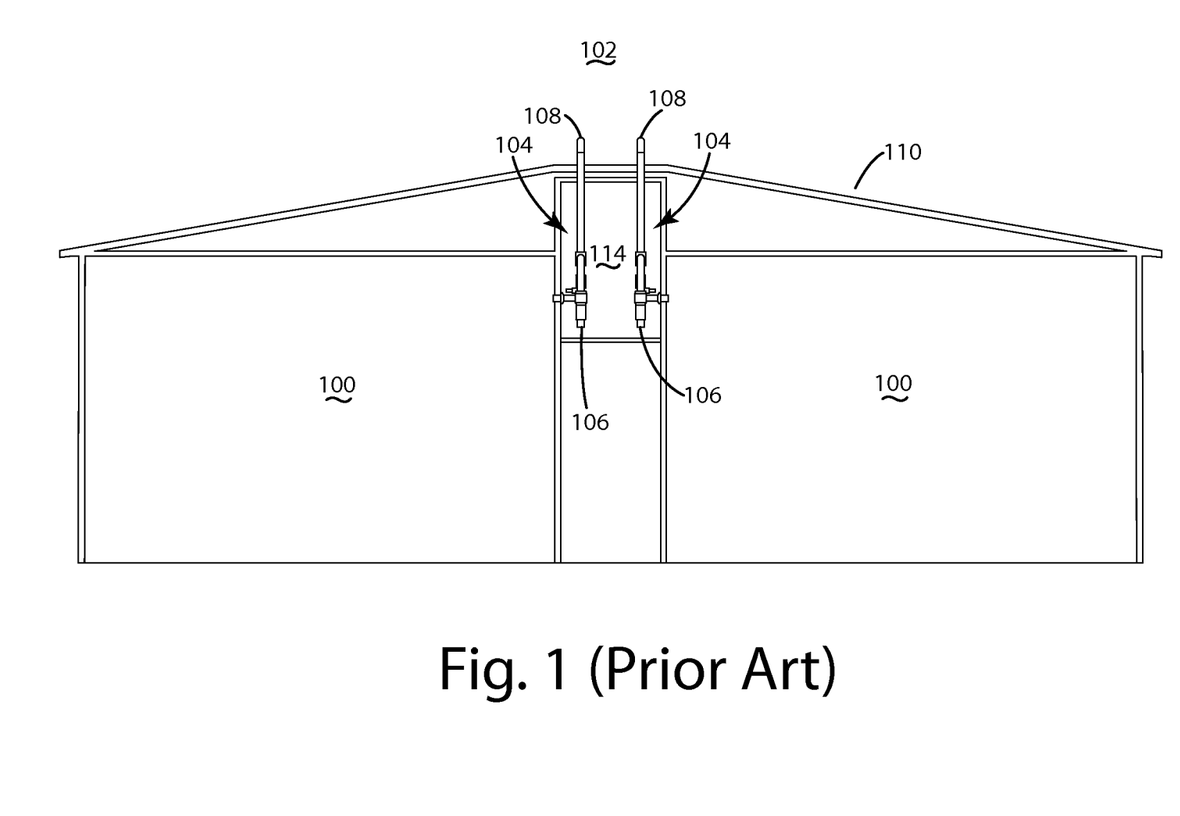
FIG. 1 is a side view of a building containing a plurality of controlled atmosphere rooms that incorporate a conventional external pressure/vacuum relief system according to the prior art.
Figure 3:
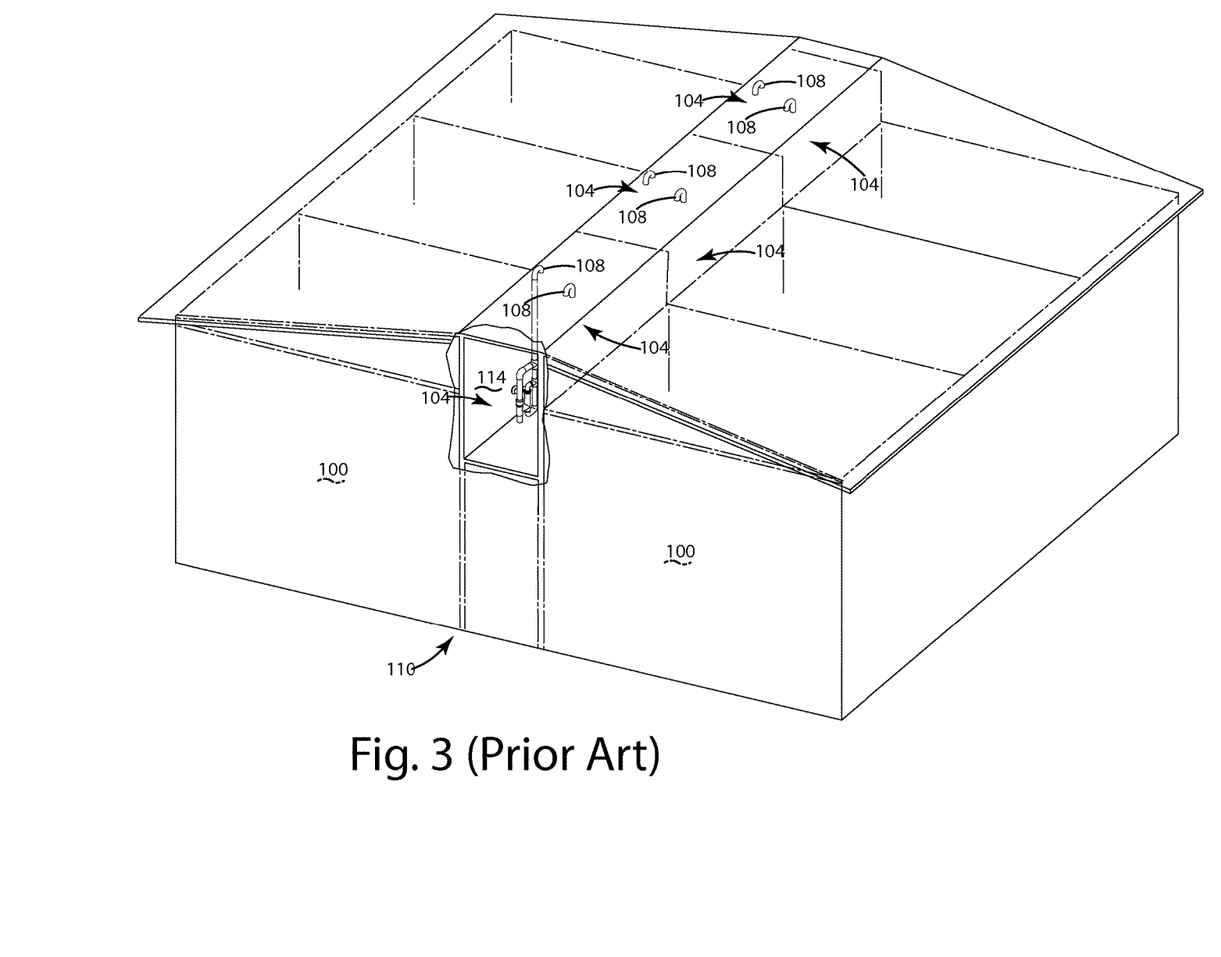
FIG. 3 is a perspective view of the building showing a plurality of conventional external pressure/vacuum relief system according to the prior art.
Figure 4:
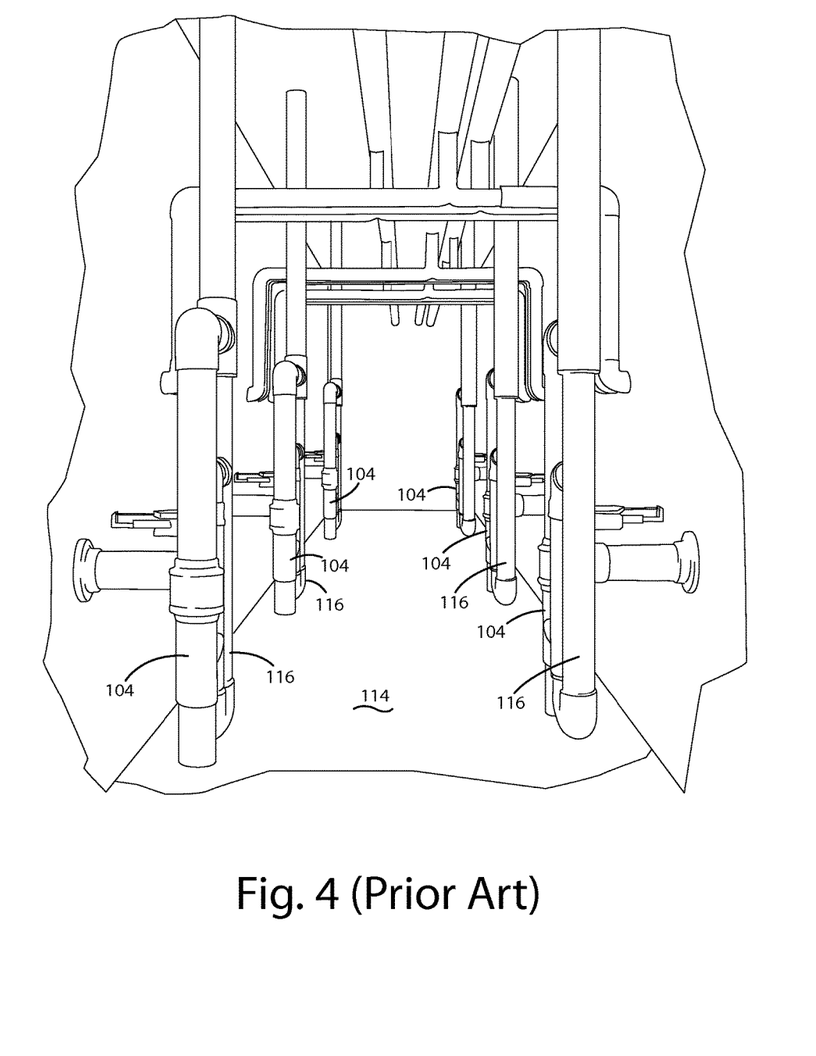
FIG. 4 is a perspective view of a portion of the building showing a plurality of conventional external pressure/vacuum relief system according to the prior art.

With a conventional system, the relief valve 100 is disposed outside the controlled atmosphere room 102. To prevent the relief valve 100 from being subjected to external weather conditions, such as snow, rain, or freezing temperatures, the pressure relief valve 100 is typically situated outside the controlled atmosphere room 100, but inside the larger building 110. For example, the relief valve 104 may be situated in an overhead space 114, such as shown in FIGS. 1, 3 and 4. It is generally undesirable to exhaust gases from inside the controlled atmosphere room 100 into the larger building 110, where the gases might have a negative impact. As a result, the pressure relief valve 104 typically includes an exhaust pipe that runs from the relief valve 104 to the external environment 102 (i.e. outside the larger building 110). In the illustrated embodiment, the vent pipe vents through the roof of the building (See FIGS. 1 and 3).

Figure 2:
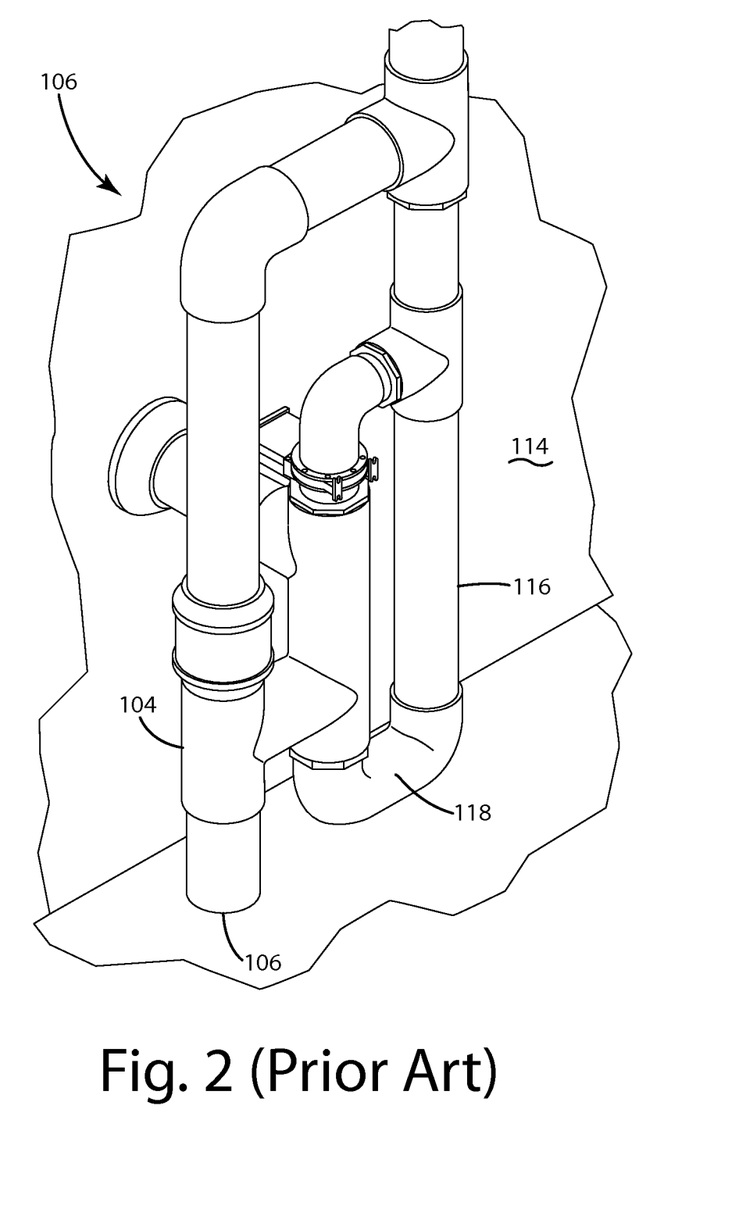
FIG. 2 is a perspective view of a portion of a pressure/vacuum relief system according to the prior art.

A typical section of pipework containing a conventional pressure relief valve is shown in FIG. 2. In the illustrated application, the relief valve 104 includes a pressure valve arrangement that opens in response to excessive positive pressure within the controlled atmosphere room. When the pressure valve is open, air is free to vent to the external environment, thereby reducing internal pressure. The illustrated relief valve also includes a vacuum valve arrangement that opens in response to excessive negative pressure within the controlled atmosphere room. When the negative valve is open, air is drawn from the overhead space 114 into the controlled atmosphere room to adequately equalize pressure. In the illustrated application, the pressure relief valve 104 is connected in parallel with a water-filled trap pressure bypass 116 that functions as a back-up system to allow pressure equalization even if the relief valve fails. As show in FIG. 2, the pressure bypass 116 may include a water trap 118 that contains an amount of water selected to set the desired bypass pressure. When a positive or negative pressure differential becomes great enough, air can bubble through the water trap 118. A typical trap pressure bypass arrangement not only requires additional pipework, but also requires ongoing maintenance. For example, the appropriate amount of water must be maintained within the trap 118. This may require a serviceman to periodically check the status of the water column and add water (or other fluids) as evaporation affects the system.

In a conventional system, the pipework required to implement the pressure/vacuum relief system is extensive, resulting in significant installation cost and occupying a substantial amount of space within the building. These issues are compounded in buildings that include a plurality of controlled atmosphere rooms 100. For example, FIG. 4 shows the crowded overhead space 114 of the building 110 of FIGS. 1 and 3. This illustration shows the relief system pipework for the six controlled atmosphere rooms 100, as well as additional pipework for other facilities/services associated with the controlled atmosphere rooms.

SUMMARY OF THE INVENTION

The present invention provides a pressure/vacuum relief system having one or more pressure relief/vacuum valve assemblies disposed within the controlled atmosphere room and a vent pipe to provide two-way fluid communication between the relief valve assembly and the outside environment. The relief valve assembly may be a split valve arrangement that includes a pressure valve that opens in response to positive pressure in the controlled atmosphere room and a vacuum valve that opens response to negative pressure in the controlled atmosphere room. The pressure and vacuum valves may be incorporated into a single valve body on opposite sides of a shared chamber that is coupled to the vent pipe. In one embodiment, the vent pipe is fitted through an external wall of the controlled atmosphere room.

In one embodiment, the relief valve includes a pressure valve and a vacuum valve that are capable of vertical movement. The pressure valve may include a valve plate (or valve disk) that is seated by gravity and is unseated by a positive pressure differential between the interior of the controlled atmosphere room and the environmental air pressure. The valve plate for the pressure valve may be positioned vertically below the shared chamber and may be vertically lifted from a pressure valve seat by the positive pressure differential. The vacuum valve may include a valve plate (or valve disk) that is seated by gravity and is unseated by a negative pressure differential between the interior of the controlled atmosphere room and the environmental air pressure. The valve plate for the vacuum valve may be positioned vertically above the shared chamber and may be vertically lifted from a pressure valve seat by the negative pressure differential.

In one embodiment, the pressure/vacuum relief system includes a pair of separate relief valves that are disposed within the controlled atmosphere room. In one embodiment, the two separate relief valves are connected to a single vent pipe. For example, the two relief valves may be coupled to the vent pipe by a T-fitting or a Y-fitting. The two relief valves may be positioned adjacent the exterior wall through which the vent pipe passes.

The present invention provides a simple and effective pressure/vacuum relief system in which one or more relief valves are situated inside the controlled atmosphere room, where they will not be impacted by external environmental factors, such as weather. The present invention eliminates the need for an interior space inside the larger building to contain the pressure relief valves. It also eliminates the need for pipework required to allow standard pressure relief valves to vent to the outside environment. This system removes pipework from an internal mechanical space, which reduces the risk of low oxygen in a confined space.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF THE CURRENT EMBODIMENT

Overview.

Figure 5:
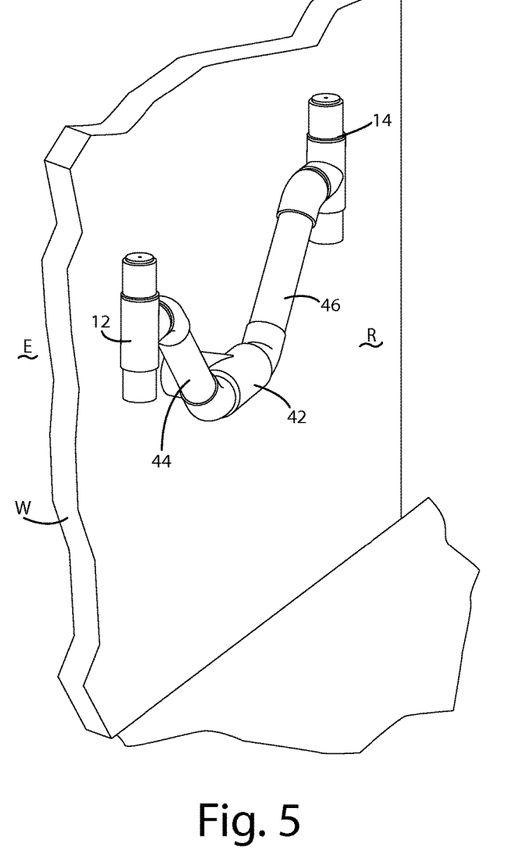
FIG. 5 is a perspective view of a pressure/vacuum pressure relief system according to one embodiment of the present invention.
Figure 6:
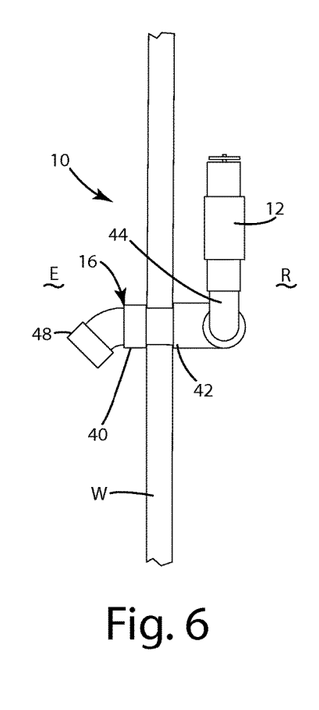
FIG. 6 is a side view of the pressure/vacuum pressure relief system passing through an exterior wall of the controlled atmosphere room.
Figure 7:
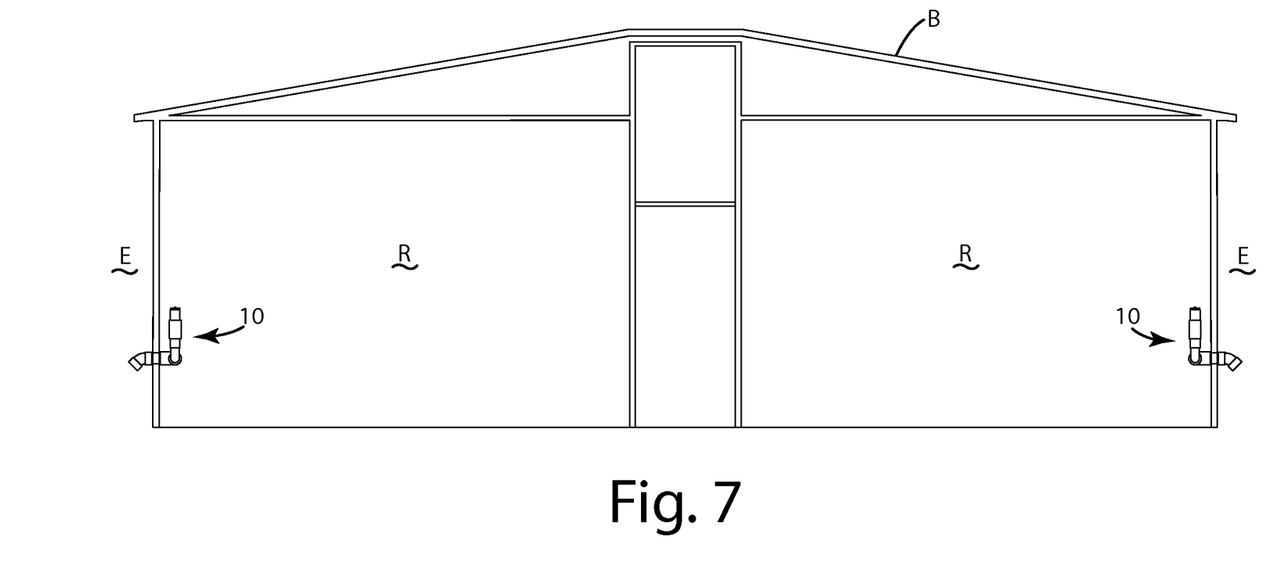
FIG. 7 is a side view of a building containing a plurality of controlled atmosphere rooms similar to FIG. 1 showing pressure/vacuum relief systems.

A pressure/vacuum relief system 10 in accordance with an embodiment of the present invention is shown in FIGS. 5-9. The pressure/vacuum relief system 10 of FIG. 5 includes two relief valves 12 and 14 that are situated within the interior of a controlled atmosphere room R. The two relief valves 12 and 14 are in communication with the external environment E by a vent pipe 16 that passes through an exterior wall W. Each relief valve 12 and 14 includes a pressure valve arrangement 32 that opens in response to a positive pressure differential between the interior of the controlled atmosphere room R and the external environment E, and a vacuum valve arrangement 34 that opens in response to a negative pressure differential between the interior of the controlled atmosphere room R and the external environment E. FIG. 7 is an illustration of a building B containing a plurality of controlled atmosphere rooms R that incorporate pressure/vacuum relief systems 10 according to the present invention. The controlled atmosphere rooms R are situated along exterior walls of the building B, and each controlled atmosphere room R includes a separate pressure/vacuum relief system 10 with separate relief valves 12 and 14 and a separate vent pipe 16 that extends through the corresponding exterior wall W of the building B. Although the present invention is intended primarily for use in connection with the storage of fruits, vegetables and other perishable commodities, it may be incorporated into other applications that do not involve perishable commodities, but might still benefit from pressure/vacuum relief.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

General Description.

The present invention will now be described in more detail in the context of a building B having a plurality of controlled atmosphere rooms R that each incorporate a pressure/vacuum relief systems 10. The pressure/vacuum relief systems 10 are generally identical to one another. Accordingly, only a single system 10 will be described in detail. It should be understood that the other pressure/vacuum relief systems are generally identical to pressure/vacuum relief system 10, except to the extent otherwise described herein. Although the present invention is described in the context of a building B with a plurality of controlled atmosphere rooms R situated along exterior walls, a pressure/vacuum relief system in accordance with the present invention may be incorporated into essentially any controlled atmosphere room in essentially any building structure, including configurations in which the building is a single controlled atmosphere room. In applications where the controlled atmosphere room does not incorporate an exterior wall, an extended vent pipe or arrangement of vent pipes may be use to provide fluid communication with the external environment.

Referring now to FIG. 5, the pressure/vacuum relief system 10 generally includes two relief valves 12 and 14 that are coupled to a vent pipe 16. The relief valves 12 and 14 are situated within the interior of a controlled atmosphere room 16. The vent pipe 16 passes through an exterior wall W and provides an air flow path from the relief valves 12 and 14 to the external environment E. In this embodiment, the two relief valves 12 and 14 are generally identical. Accordingly, only relief valve 12 will be described in detail. It should be understood, however, that the present invention can be implemented with a different number of relief valves, including a single relief valve or more than two relief valves. Further, in applications that include multiple relief valves, it is not necessary for the relief valves to be generally identical as shown in the illustrated embodiment. In some applications, it may be desirable to use different types of relief valves or pressure bypass arrangements. For example, relief valve 12 may be combined with a water-trap pressure bypass of the type discussed above in connection with the prior art system shown in FIG. 1.

As perhaps best shown in FIG. 6, the vent pipe 16 is fitted through an external wall of the controlled atmosphere room. It is coupled to a single port on the relief valve 12 and provides an air flow path for air from within the controlled atmosphere room 10 to vent to the external environment and for air from the external environment to flow into the controlled atmosphere room 10. The vent pipe 16 may vary in size and shape depending on the configuration of the controlled atmosphere room 16. For example, the vent pipe 16 may be scaled to provide appropriate air flow based on various factors, such as the air capacity of the controlled atmosphere room 16, the length of the vent pipe 16 and the expected pressure variations. This may include varying the internal of the vent pipe 16 to provide the desired capacity for air flow to and from the relief valves 12 and 14. Further, the vent pipe 16 may vary depending on the design and configuration of the building B in which the controlled atmosphere room R is situated, as well as the position of the controlled atmosphere room within the building B. For example, if the controlled atmosphere room 10 does not have an exterior wall or has an exterior wall through which it is not practical to extend the vent pipe 16, the vent pipe 16 may be routed to an alternative location. In some applications, the vent pipes for a plurality of controlled atmosphere rooms may merge together and share a common vent pipe (not shown). This alternative approach may be particularly useful in applications where it is desirable to limit the number of times the exterior wall is penetrated by vent pipes.

Referring now to FIGS. 5 and 6, the illustrated vent pipe 16 has a generally Y-shaped configuration with a wall segment 40 that extends through the wall W, a T-fitting 42 fitted to the interior end of the wall segment 40, a first riser segment 44 that extends upwardly and outwardly from one side of T-fitting 42 to join T-fitting 42 to relief valve 12 and a second riser segment 46 that extends from the opposite side of T-fitting 42 to join T-fitting 42 to relief valve 14. The external end of the wall segment 40 may include a downturned fitting 48. The downturned fitting 48 may reduce the likelihood of rain, snow and other forms of precipitation from entering the vent pipe 16. Although downturned fitting 48 is shown as a 45 degree elbow, it could be of an alternative configuration. For example, it could be a 90 degree elbow. The illustrated vent pipe 16 is merely exemplary. The vent pipe 16 may vary from application to application to accommodate variation in the design and configuration of the building B, the controlled atmosphere room R or the pressure/vacuum relief system 10. For example, in one alternative embodiment, each relief valve 12 and 14 may include a separate vent pipe 16. As another example, the T-fitting 42 may be replaced by a Y-fitting or other component or arrangement of components capable of merging the two riser segments 44 and 46 into the wall segment 40. The riser segments 44 and 46 are inclined downwardly away from the relief valves 12 and 14 so that any condensation within those segments from temperature changes as air moves in and out will drain away from the relief valves 12 and 14. This will reduce the possibility of condensation accumulating on the valve members, particularly valve disk 24 (described below), where it could affect the valve actuation pressure. Although the vent pipe 16 of the illustrated embodiment is assembled from PVC or other plastic pipe components, the vent pipe 16 may be assembled from alternative pipework or air flow components. For example, one or more portions of the vent pipe may be manufacture from ductwork, such as HVAC-style steel ductwork.

The relief valve 12 is configured to open in response to excessive positive pressure or excessive negative pressure in the controlled atmosphere room. More specifically, in the illustrated embodiment, the relief valve 12 is configured to open and close based on the pressure differential between the controlled atmosphere room R and the external environment E. In the illustrated embodiment, the relief valve 12 includes a pair of separate valve arrangements—one that opens in response to a positive pressure differential and another that opens in response to a negative pressure differential. The relief valve 12 may be adjusted to operate in response to different pressure differentials. In alternative embodiments, the relief valve may include a single valve capable of opening in response to positive or negative pressure. In another alternative embodiment, the two valve arrangements may be incorporated into separate valve bodies and may include separate vent pipes.

The relief valve 12 of FIGS. 5-9 is a split valve that includes a pressure valve arrangement 32 to open in response to positive pressure and a vacuum valve arrangement 34 to open in response to negative pressure. More specifically, the illustrated relief valve 12 includes a pressure valve arrangement 32 having a pressure valve member 24 that interacts with a pressure valve seat 28 and a vacuum valve arrangement 34 having a vacuum valve member 26 that interacts with vacuum valve seat 30. The pressure valve arrangement 32 opens in response to a positive pressure differential between the interior of the controlled atmosphere room and the external environment. The vacuum valve arrangement 34 opens in response to a negative pressure differential between the interior of the controlled atmosphere room and the exterior environment.

Figure 8:
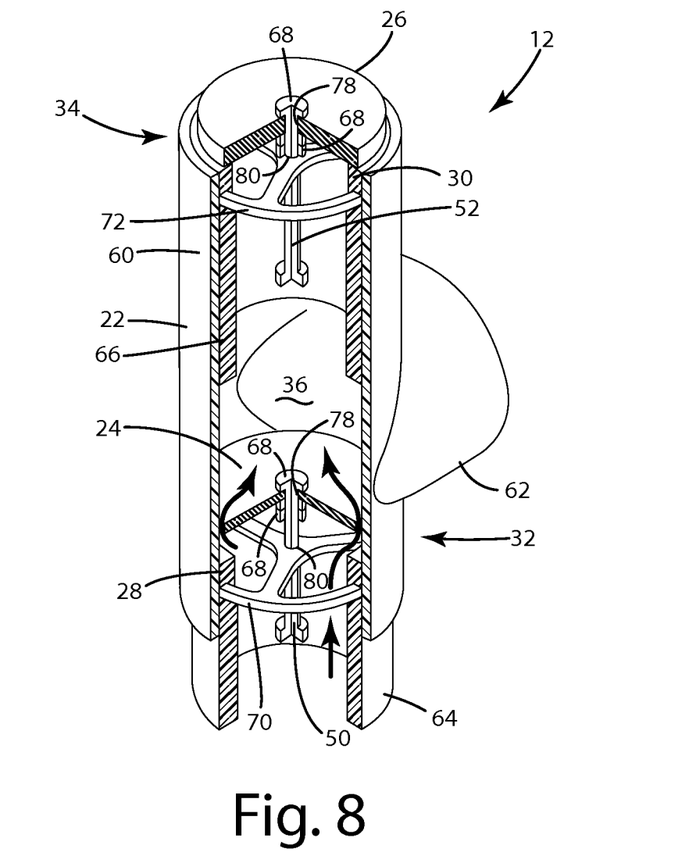
FIG. 8 is a sectional view of a single relief valve showing the pressure valve in the unseated position.
Figure 9:
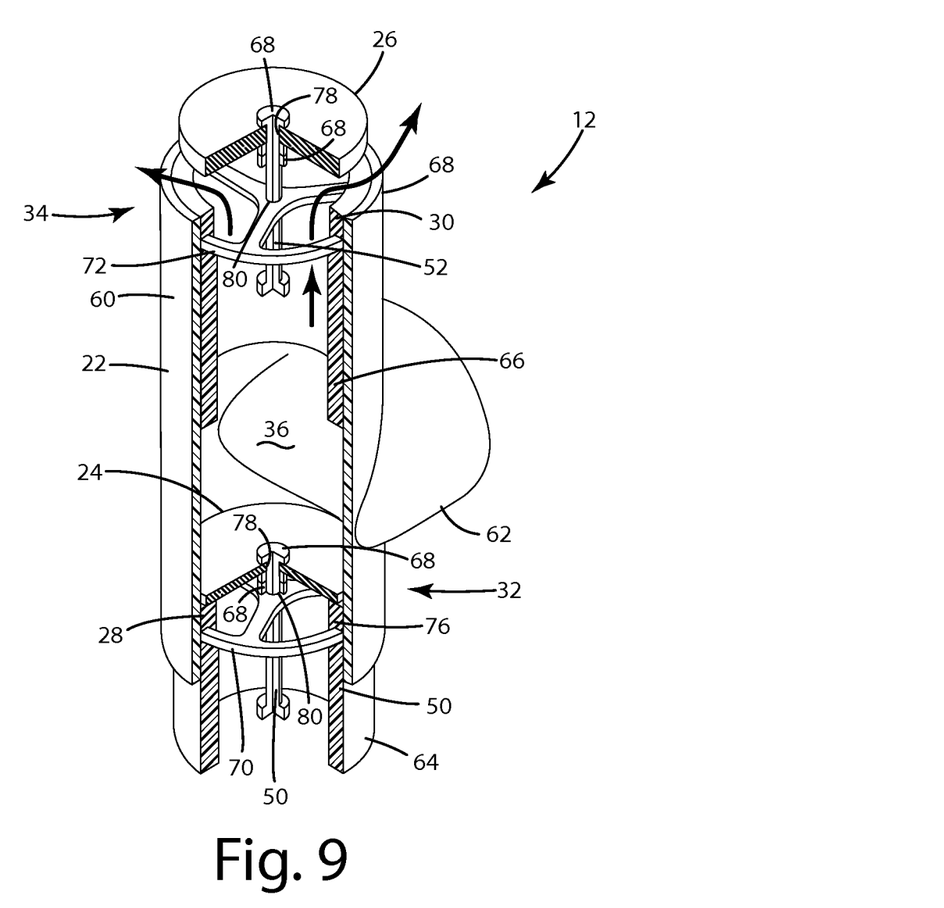
FIG. 9 is a sectional view of a single relief valve showing the vacuum valve in the unseated position.

Referring now to FIGS. 8 and 9, the illustrated relief valve 12 has a single valve body 22 having a vertical segment 60 and a horizontal segment 62. The valve body 22 defines a central chamber 36 generally located at the intersection of the vertical segment 60 and the horizontal segment 62. The vent pipe 16 is coupled to the horizontal segment 62 such that the central chamber 36 is in fluid communication with the external environment E. In this embodiment, the pressure valve seat 28 and vacuum valve seat 30 are disposed within the vertical segment 60 on opposite sides of the central chamber 36. For example, the pressure valve member 24 and pressure valve seat 28 may be positioned in the vertical segment 60 immediately below the central chamber 36, and the vacuum valve member 26 and vacuum valve seat 30 may be positioned in the vertical segment 60 immediately above the central chamber 36. As a result, the pressure valve arrangement 32 and the vacuum valve arrangement 34 are in fluid communication with the central chamber 36, the vent pipe 16 and ultimately the external environment E.

In the illustrated embodiment, the pressure valve member 24 and the vacuum valve member 26 are valve disks. Each valve disk is generally disk-shaped having an outer diameter that is sufficiently smaller than the inside diameter of the portion of the valve body 22 in which the valve disk is positioned. The difference between the inner diameter of the valve body 22 and the outer diameters of the valve disks 24 and 26 may be varied to tune operation of the valve arrangements 32 and 34. The valve disks of the illustrated embodiment are manufactured from PVC, but they may alternatively be manufactured from other suitable materials. The valve disks are merely exemplary and the pressure valve arrangement 32 and vacuum valve arrangement 34 may include other types of valve members, such as flap valves, pinch valves, butterfly valves. In the illustrated embodiment, each valve disk 24 and 26 includes a central shaft 50 and 52. The central shafts 50 and 52 of the illustrated embodiment are coaxially joined to the corresponding valve disks 24 and 26. In the illustrated embodiment, each shaft 50 and 52 is a bolt that extends freely through a central through-bore 80 in the corresponding guide ring 70 and 72 (described below). The shafts 50 and 52 are capable of being fitted with weights that permit adjustment of the actuation pressure of the valve arrangement 32 and 34. In this embodiment, the weights are nuts 68 that can be threadedly fitted on to the bolts 50 and 52. In use, the size and number of nuts 68 fitted onto the bolts 50 and 52 may be selected to provide the valve members 24 and 26 with the appropriate weight. For example, additional nuts 68 can be installed on a bolt 50 and 52 to increase the overall weight of the associated valve disk 24 and 26, thereby increasing the pressure differential required to lift the valve disk 24 and 26 away from the valve seat 28 and 30. In the illustrated embodiment, the bolts 50 and 52 are mounted to the valve disks 24 and 26 in an inverted position by a pair of nuts 68 tightened against opposite sides of valve disks 24 and 26. The nuts 68 clamp the disk 24 to provide a rigid connection between the bolts 50 and 52 and the valve disks 24 and 26. The endmost nut 68 may be a cap nut that is threadedly installed on the end of the bolt 50 and 52. Additional nuts 68 may be fitted onto the bolts 50 and 52 as desired to provide the desired weight. Any additional nuts 68 are positioned along the bolts 50 and 52 where they will not interfere with movement of the valve disks 24 and 26. Because the bolts 50 and 52 are inverted, the bolt heads are located at the bottom end of each bolt 50 and 52 below the guide rings 70 and 72. This prevents the bolts 50 and 52 (and consequently the valve disks 24 and 26) from separating from the guide rings 70 and 72. Although the valve disks 24 and 26 of the illustrated embodiment each include a bolt and nut assembly, the bolt and nut assemblies can be replaced by other types of assemblies. For example, the central shaft may be essentially any rod-like structure that allows movement of the valve disks 24 and 26 with respect to the guide rings 70 and 72. The rod-like structure may be configured to receive one or more weights to allow adjustment of the actuation pressure of the valve assembly 32 and 34.

In this embodiment, the pressure valve seat 28 and the vacuum valve seat 30 are generally ring-shaped and are formed from rubber or other material of sufficient resiliency to form a leak-tight seal with the valve members 24 and 26. As shown in FIGS. 8 and 9, each valve arrangement 32 and 34 may also include an inner sleeve 64 and 66 and a guide ring 70 and 72. The inner sleeve 64 and 66 and guide ring 70 and 72 are configured to provide a mounting structure for the valve seats 28 and 30 and the valve disks 24 and 26. Each inner sleeve 64 may be generally tubular and have inner and outer diameters that correspond with the inner and outer diameters of the valve seats 28 and 30. For example, the inner sleeves 64 and 66 may be manufactured from PVC and may be secured within the valve body 22 using conventional PVC adhesive. The guide rings 70 and 72 are fitted into the valve body 22 atop the corresponding inner sleeve 64 and 66. Each guide ring 70 and 72 includes an outer ring, a central hub and a plurality of spokes that join the outer ring to the central hub. In the illustrated embodiment, the guide rings 70 and 72 each include three radially symmetric spokes, but the number of spokes may vary from application to application. The guide rings 70 and 72 are configured with relatively large openings between the spokes so that the guide rings 70 and 72 do not hamper air flow through the valve arrangements 32 and 34. Each central hub defines a centrally located through-bore that slidably receives the corresponding bolt 50 and 52. This allows the guide rings 70 and 72 to shepherd vertical motion of the valve members 24 and 26. The valve seats 28 and 30 may be fitted into the valve body 22 atop of the corresponding guide rings 70 and 72.

As illustrated by comparison of FIGS. 8 and 9, the pressure valve member 24 and vacuum valve member 26 are capable of vertical movement within the valve body 22. In operation, the pressure valve member 24 is seated against pressure valve seat 28 by gravity and is unseated by a positive pressure differential between the interior of the controlled atmosphere room R and the environmental air pressure E. The pressure differential required to actuate the pressure valve member 24 may be adjusted by varying the weight of the pressure valve member 24. For example, the weight of the valve disk 24, the central shaft 50 and the number of nuts 68 fitted onto the central shaft 50 may be selected to control the pressure valve arrangement 32. Similarly, the vacuum valve member 26 is seated against the vacuum valve seat 30 by gravity and is unseated by a negative pressure differential between the interior of the controlled atmosphere room R and the environmental air pressure E. As with the pressure valve member 24, the pressure differential required to actuate the vacuum valve member 26 may be adjusted by varying the weight of the vacuum valve member 26. For example, the weight of the valve disk 26, the central shaft 52 and the number of nuts 68 fitted onto the central shaft 52 may be selected to control the vacuum valve arrangement 34.

In the illustrated embodiment, the valve seats 28 and 30 are manufactured from rubber or other sufficiently resilient material. This material provides a leaktight seal when the valve disks 24 and 26 are seated in the closed position. Alternatively, rubber or other sufficiently resilient material may be incorporated into the valve disks 24 and 26. For example, the valve disks 24 and 26 may be manufactured from a rubber or other sufficiently resilient material. Or, a layer of rubber or other sufficiently resilient material can be secured to the undersurface of each valve disk 24 and 26 to engage with the corresponding valve seat 28 and 30.

As an alternative to the passive valve arrangements described above, the pressure valve arrangement 32 and/or vacuum valve arrangement 34 may be replaced by an automated valve arrangement. For example, the system may include a pneumatic, hydraulic or electromechanical valve, a pressure sensor and a controller for opening and closing the valve in response to variations in pressure within the controlled atmosphere room R.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A pressure/vacuum relief system for a controlled atmosphere room storing perishable commodities, the system comprising:

a vent pipe extending through an exterior wall of the controlled atmosphere room such that said vent pipe is in fluid communication with an interior of the controlled atmosphere room and an exterior environment; and a relief valve coupled to said vent pipe in fluid communication, said relief valve disposed within the interior of the controlled atmosphere room, said relief valve having a pressure valve configured to open in response to a positive pressure differential between the interior of the controlled atmosphere room and the exterior environment in which the pressure is higher in the interior of the controlled atmosphere room than in the exterior environment, said relief valve having a vacuum valve configured to open in response to a negative pressure differential between the interior of the controlled atmosphere room and the external environment in which the pressure is lower in the interior of the controlled atmosphere room than in the exterior environment, said relief valve having a single valve body, said pressure valve and said vacuum valve disposed in said valve body, said pressure valve including a pressure valve plate and a pressure valve seat, said pressure valve being oriented such that said pressure valve plate is seated against said pressure valve seat by gravity, said vacuum valve includes a vacuum valve plate and a vacuum valve seat, said vacuum valve being oriented such that said vacuum valve plate is seated against said vacuum valve seat by gravity, wherein said pressure valve and said vacuum valve are separately in fluid communication with the controlled atmosphere room and each are in fluid communication with the exterior environment through said vent pipe;

wherein said valve body defines a central chamber, said pressure valve disposed vertically below said central chamber, said vacuum valve disposed vertically above said central chamber within the controlled atmosphere room.

2. A pressure/vacuum relief system for a controlled atmosphere room storing perishable commodities, the system comprising:

a vent pipe extending through an exterior wall of the controlled atmosphere room such that said vent pipe is in fluid communication with an interior of the controlled atmosphere room and an exterior environment; and a first relief valve coupled to said vent pipe in fluid communication, said relief valve disposed within the interior of the controlled atmosphere room, said relief valve having a pressure valve configured to open in response to a positive pressure differential between the interior of the controlled atmosphere room and the exterior environment in which the pressure is higher in the interior of the controlled atmosphere room than in the exterior environment, said relief valve having a vacuum valve configured to open in response to a negative pressure differential between the interior of the controlled atmosphere room and the external environment in which the pressure is lower in the interior of the controlled atmosphere room than in the exterior environment, said relief valve having a single valve body, said pressure valve and said vacuum valve disposed in said valve body, said pressure valve including a pressure valve plate and a pressure valve seat, said pressure valve being oriented such that said pressure valve plate is seated against said pressure valve seat by gravity, said vacuum valve includes a vacuum valve plate and a vacuum valve seat, said vacuum valve being oriented such that said vacuum valve plate is seated against said vacuum valve seat by gravity, wherein said vacuum valve and said pressure valve are separately in fluid communication with the controlled atmosphere room and each are in fluid communication with the exterior environment through said vent pipe, and wherein said pressure valve is disposed vertically below said vacuum valve within the controlled atmosphere room; and wherein said valve body is generally T-shaped having a vertical segment and a horizontal segment, said valve body defining a central chamber at an intersection of said vertical segment and said horizontal segment.

3. The system of claim 2 wherein said pressure valve is disposed in said vertical segment below said central chamber, said vacuum valve disposed in said vertical segment above said central chamber.

4. The system of claim 3 wherein said horizontal segment is coupled to said vent pipe.

5. The system of claim 4 further including a second relief valve, said second relief valve coupled to said vent pipe in fluid communication, said second relief valve disposed within an interior of the controlled atmosphere room, said second relief valve having a pressure valve configured to open in response to a positive pressure differential between the interior of the controlled atmosphere room and the exterior environment, said second relief valve having a vacuum valve configured to open in response to a negative pressure differential between the interior of the controlled atmosphere room and the external environment.

6. The system of claim 5 wherein said vent pipe includes a wall segment, a fitting disposed within the interior of the controlled atmosphere room and fitted to said wall segment, a first segment joining said fitting to said first relief valve, and a second segment joining said fitting to said second relief valve.

7. The system of claim 6 wherein said first relief valve is disposed vertically above said fitting and second relief valve is disposed vertically above said fitting.

8. A controlled atmosphere room comprising:
an enclosure defining an interior of the controlled atmosphere room for storing perishable commodities, said enclosure isolating said interior from an external environment; and
a relief system including a first relief valve and a vent pipe, said first relief valve disposed within said interior and coupled in fluid communication with said vent pipe, said vent pipe extending through an exterior wall of said controlled atmosphere room such that said vent pipe is in fluid communication with said interior and the exterior environment, said first relief valve having a pressure valve configured to open in response to a positive pressure differential between said interior and the exterior environment in which the pressure is higher in said interior than in the external environment, said first relief valve having a vacuum valve disposed vertically above said pressure valve of said first relief valve and configured to open in response to a negative pressure differential between said interior and the external environment in which the pressure is lower in said interior than in the external environment, wherein said vacuum valve of said first relief valve and said pressure valve of said first relief valve are each separately in fluid communication with the controlled atmosphere room and each are in fluid communication with the external environment through said vent pipe;
a second relief valve, said second relief valve coupled to said vent pipe in fluid communication, said second relief valve disposed within said interior, said second relief valve having a pressure valve configured to open in response to a positive pressure differential between said interior and the exterior environment in which the pressure is higher in said interior than in the external environment, said second relief valve having a vacuum valve disposed vertically above said pressure valve of said second relief valve and configured to open in response to a negative pressure differential between said interior and the external environment in which the pressure is lower in said interior than in the external environment, wherein said vacuum valve of said second relief valve and said pressure valve of said second relief valve are each separately in fluid communication with the controlled atmosphere room and each are in fluid communication with the external environment through said vent pipe; and
wherein said vent pipe includes a wall segment, a fitting disposed within the interior of the controlled atmosphere room and fitted to said wall segment, a first segment joining said fitting to said first relief valve, and a second segment joining said fitting to said second relief valve.

9. The room of claim 8 wherein said first relief valve is disposed vertically above said fitting and said first segment is angled downwardly from said first relief valve to said fitting; and
wherein said second relief valve is disposed vertically above said fitting and said second segment is angled downwardly from said second relief valve to said fitting.

10. A controlled atmosphere room comprising:
an enclosure defining an interior of the controlled atmosphere room for storing perishable commodities, said enclosure isolating said interior from an external environment; and
a relief system including a first relief valve and a vent pipe, said relief valve disposed within said interior and coupled in fluid communication with said vent pipe, said vent pipe extending through an exterior wall of said controlled atmosphere room such that said vent pipe is in fluid communication with said interior and the exterior environment, said relief valve having a pressure valve configured to open in response to a positive pressure differential between said interior and the exterior environment in which the pressure is higher in said interior than in the external environment, said relief valve having a vacuum valve configured to open in response to a negative pressure differential between said interior and the external environment in which the pressure is lower in said interior than in the external environment, said relief valve having a single valve body, said pressure valve and said vacuum valve disposed in said valve body, said pressure valve including a pressure valve plate and a pressure valve seat, said pressure valve being oriented such that said pressure valve plate is seated against said pressure valve seat by gravity, said vacuum valve including a vacuum valve plate and a vacuum valve seat, said vacuum valve being oriented such that said vacuum valve plate is seated against said vacuum valve seat by gravity, wherein said pressure valve and said vacuum valve are separately in fluid communication with the controlled atmosphere room and are each in fluid communication with the external environment through said vent pipe;
wherein said valve body defines a central chamber, said pressure valve disposed vertically below said central chamber, said vacuum valve disposed vertically above said central chamber within said controlled atmosphere room.

* * * * *